Jan. 1, 1957  R. W. WILSON  2,775,948

PLANT SETTER

Filed June 6, 1951

R. W. Wilson INVENTOR.

BY

# United States Patent Office 2,775,948
Patented Jan. 1, 1957

2,775,948
PLANT SETTER

Roy W. Wilson, Lexington, Ky.

Application June 6, 1951, Serial No. 230,149

1 Claim. (Cl. 111—4)

The present invention relates to an agricultural implement, and more particularly has reference to a device for setting or re-setting various types of plants such as tobacco, tomatoes, cabbages, and the like.

An important object of the present invention is to provide a device for setting or re-setting plants and the like, wherein the ground penetrating element during the planting step moves the soil pressing devices away from the hole being formed, and means associated with the soil pressing devices automatically moving and tamping the soil around the plant after the ground penetrating element has been withdrawn from the hole.

A further object of the invention is to provide a plant setting device of the character described which is relatively simple in constructional detail, positive and efficient in operation, and which can be easily and inexpensively manufactured.

And yet a further object of the invention is to provide a device for setting or re-setting various types of plants which is so constructed that the device may be efficiently operated by unskilled workmen, the operation requiring the employment of but one hand.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Broadly, the invention comprises a lower guide, an upper guide, a tubular housing surrounded by and movable with respect to the guides, a pivotally mounted ground penetrating element associated with the lower end of the housing normally closing the lower end of the housing, means connecting the penetrating element to the upper guide so that movement of the guide on the housing imparts pivotal movement to the ground penetrating element, soil pressing units pivotally attached to the lower guide, a handle pivotally supported by the housing, linkage connecting the upper guide to the handle and spring means operatively connected to the handle and housing to maintain the penetrating element normally in an inoperative position.

If desired, a valve for controlling the flow of a liquid into the interior of the housing may be supported by the housing, the opening and closing of the valve being actuated by means connecting the valve with the handle.

Figure 1:
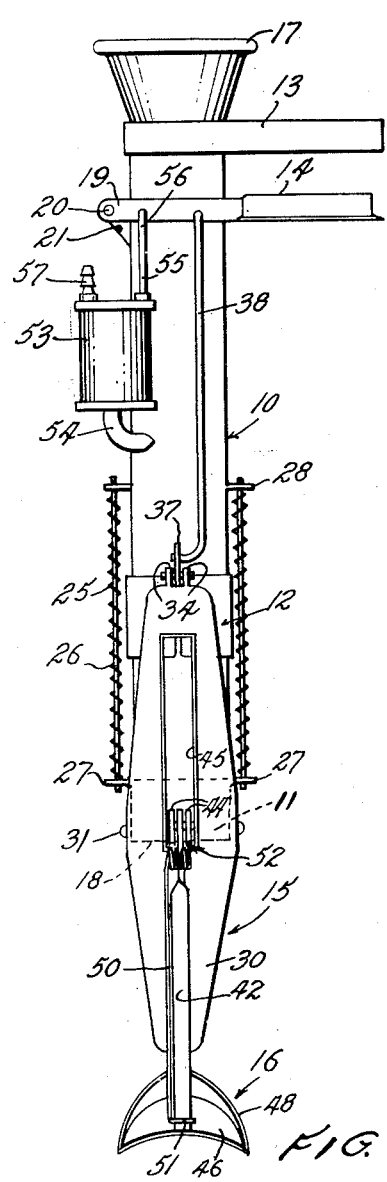
Figure 1 is a view in side elevation of the plant setting device constructed in accordance with the present invention.

As shown in Figure 1, the device comprises a tubular housing 10, a lower guide 11, an upper guide 12, a fixed handle 13, a pivotally mounted handle 14, a ground penetrating means 15, and a soil pressing means 16.

The tubular housing 10 may be of any suitable material, such as metal, and is provided with a funnel-shaped upper end 17 and an open lower end 18. The fixed handle 13 may be welded or otherwise conveniently attached to the housing adjacent the upper end, while the movable handle 14 includes a yoke member 19, the free ends of the yoke being pivoted, as at 20, to a bracket 21 secured to the housing 10. The handle 14 is normally urged downwardly away from the fixed handle 13 by means of a coil spring 22, one end of which is detachably connected to the yoke 19, as at 23, while the opposite end is similarly fixed to the housing 10, as shown at 24.

A helical spring 25 surrounds a rod 26, the lower end of the rod being attached to an ear or the like 27 extending outwardly from the lower guide 11 in proximity to the upper edge thereof, while the opposite end of the rod extends through an opening formed in an outwardly extending ear 28 affixed to the tubular housing. There are, of course, two such spring assemblies 25, the assemblies being diametrically disposed, as perhaps best shown in Figure 1. The springs will normally maintain the housing in the position shown in Figure 1.

Figure 2:
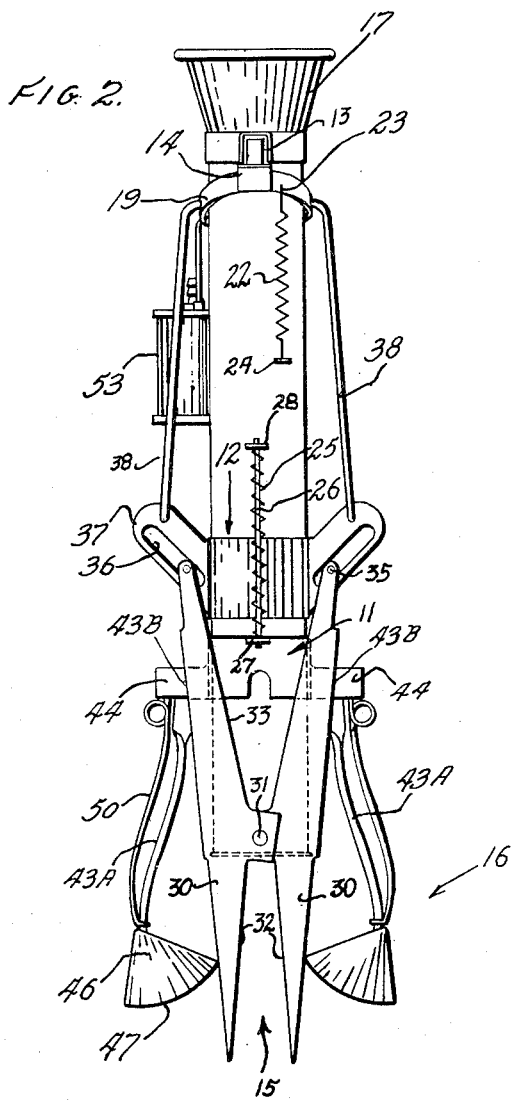
Figure 2 is an end elevational view of the plant setting device shown in Figure 1, the parts being shown in their operative position.

The ground penetrating means 15 comprises a pair of complemental members 30 which are arcuate in cross section, the members being pivotally connected intermediate the ends thereof, as shown at 31, for pivotal movement about a horizontal axis. As shown in Figure 2, the mating edges of the lower ends of each arcuate member 30 are substantially vertical, as at 32, to provide a closure, so to speak, for the open lower end 18 of the housing 10. The edges of the arcuate members 30 above the pivot point 31 incline outwardly and upwardly, as indicated at 33, the upper free end of each member 30 being provided with spaced ears 34 between which a roller or the like (not shown) is journaled on a pivot pin 35. The pivot pin 35 rides in an inclined elongated slot 36 formed in an outwardly extending wing 37 carried by the upper guide 12. A connecting rod 38 is detachably connected at its opposite ends to the yoke 19 and to each wing 37, as indicated at 40 and 41, respectively. Manifestly, by moving the handle 14 upwardly about its pivot 20, the connecting rods 38 will move the guide 12 upwardly and cause the rollers to move downwardly in the slots 36 and thus move the arcuate members outwardly about their pivots 31. Upon pressure being released on the handle 14, the spring 22 will move the yoke 19 together with the connecting rods 38 downwardly and, as a consequence, the arcuate members will be moved inwardly about their pivots. The soil pressing means 16 likewise includes a pair of elements 42 and each element includes a supporting arm 43A, the upper end of which is pivotally mounted by a pin 43B on a pair of ears 44 which extend substantially horizontally from the lower guide 11, each pair of ears projecting through an elongated slot 45 in each arcuate member 30, the slot extending from a point in proximity to the pivot 31 and terminating a short distance below the ears 34. The lower end of each arm 43A supports an arcuate foot 46 which is substantially half moon-shaped in top plan, the side edges of the foot extending upwardly at an angle, as indicated at 47. A generally similar element 48 is secured to the edges of the foot, this member extending rearwardly, as at 49. A spring member 50 is anchored at the lower end to the arm 43A, as shown at 51, while the upper end of the spring is fixedly secured to one of the ears 44, as shown at 52. The spring 50 functions to move the arms 43A toward each other.

In order to introduce a suitable liquid such as a liquid fertilizer or the like into the hole in which the plant is deposited, it will be seen that a valve body 53 is firmly supported by the housing 10, preferably in the vicinity of the upper end of the housing. The lower end of the valve body is provided with a tubular conduit 54 which communicates with the interior of the housing 10. The movable valve (not shown) within the body 53 is provided with a stem 55, the upper end of the stem being suitably connected to the yoke 19, as shown at 56. The valve is normally closed and it will be appreciated that by movement of the handle 14 upwardly will lift the valve from its seat at the same time the arcuate members 30 are being moved outwardly about their pivots. A flexible tube or the like is adapted to be detachably connected to the fitting 57, the opposite end of the tube leading to a suitable liquid reservoir which can be of the type supported by the wearer's body. Since this forms no part of the present invention, it is thought unnecessary to illustrate in greater detail.

While the operation of the tool is thought to be apparent, it may be summarized briefly as follows:

Assuming that a plant is deposited within the housing 10 and the parts are in the position illustrated in Figure 2, the operator applies pressure to the stationary handle 13 which forces the housing 10, yoke 19 and upper guide 12 downwardly. This, of course, is against the action of the springs 25 and by virtue of the slots 45, the arcuate members 30 can move to a point below the presser feet 46. Of course the lower end of the arcuate members will enter the soil and by moving the handle 14 toward the handle 13, the lower ends of the arcuate members 30 are pivoted outwardly to enlarge the hole and at the same time open the end 18 of the tube to permit the plant to drop into the thus formed opening. Simultaneously the presser feet 46 are moved outwardly about their pivots to the ears 44 against the action of the springs 50 by virtue of the outer face of each arcuate member engaging the inner faces of the presser feet. Upon release of pressure on the handle 14, the spring 22 will again move the arcuate members 30 toward each other and the springs 50 will urge the presser feet 46 together to move the soil inwardly to cover the hole, and by relieving the pressure on the fixed handle 13 the springs 25 will urge the housing and movable parts upwardly.

At the time the arcuate members are moved outwardly about their pivots, liquid will also be admitted into the tube by virtue of the valve being lifted off its seat, due to the upward movement of the valve stem 55. The device is now ready for a subsequent planting, and it can be seen that the unit is quite simple in construction, relatively light in weight, and can be easily manipulated with one hand.

This invention is not to be confined to any strict conformity with the showing in the drawing but may be changed or modified so long as such changes or modifications mark no material departure from the salient features of the invention as expressed in the appended claim.

I claim:

A plant setter comprising a tubular housing having open upper and lower ends, a lower guide sleeve surrounding the housing adjacent the lower end thereof and slidable on the housing, a pair of diametrically disposed presser feet each pivotally connected to the lower guide sleeve for movement about a horizontal axis, a spring associated with each of said feet urging said feet toward each other, a pair of ground penetrating means pivotally connected to the housing for movement about a horizontal axis and normally closing the open lower end of the housing, an upper guide sleeve surrounding the housing above the lower guide sleeve and slidable along the housing, spring means operatively connected to the lower guide sleeve and to the housing normally urging said guide sleeves away from each other, an outwardly extending wing on each side of the upper guide sleeve, each wing having an inclined elongated slot therein, a roller carried by the upper end of each of the ground penetrating means lodged in and movable in said slot, the slots and rollers defining a sliding connection between the ground penetrating means and the upper guide sleeve, a fixed handle on the housing, a handle pivotally mounted on the housing adjacent to the fixed handle, a spring connected to the pivotally mounted handle and the housing normally urging the pivotally mounted handle away from the fixed handle, and a rigid link means extending between the pivotally mounted handle and the upper guide sleeve so that the application of pressure to the fixed handle forces the housing and upper guide sleeve downwardly against the action of the spring means connected to the housing and the lower guide sleeve, the rollers moving up the inclined slots in the wings whereby the ground penetrating means enter the ground, and the movement of the pivotally mounted handle toward the fixed handle sliding the upper guide sleeve away from the lower guide sleeve, the rollers moving down the inclined slots in the wings thereby moving the ground penetrating means about their horizontal axis to open the lower end of the housing and form a hole, said presser feet being engaged by and moved about their horizontal axis by such movement of the ground penetrating means against the action of the springs associated with said feet.

References Cited in the file of this patent

UNITED STATES PATENTS

| | | |
|---|---|---|
| 191,364 | Nolan et al. | May 29, 1877 |
| 516,274 | Morgan | Mar. 13, 1894 |
| 551,421 | Walter | Dec. 17, 1895 |
| 637,464 | Hostetter et al. | Nov. 21, 1899 |
| 1,077,822 | Engleman | Nov. 4, 1913 |
| 1,456,921 | Elliott | May 29, 1923 |
| 2,202,229 | Owen | May 28, 1940 |
| 2,234,873 | Mason | Mar. 11, 1941 |